(12) United States Patent
Tanaka

(10) Patent No.: US 9,020,569 B2
(45) Date of Patent: Apr. 28, 2015

(54) MOBILE PHONE

(71) Applicant: Rohm Co., Ltd., Kyoto (JP)

(72) Inventor: Masahide Tanaka, Osaka (JP)

(73) Assignee: Rohm Co., Ltd., Kyoto (JP)

( * ) Notice: Subject to any disclaimer, the term of this patent is extended or adjusted under 35 U.S.C. 154(b) by 51 days.

(21) Appl. No.: 13/860,973

(22) Filed: Apr. 11, 2013

(65) Prior Publication Data

US 2013/0275786 A1      Oct. 17, 2013

(30) Foreign Application Priority Data

Apr. 13, 2012   (JP) .................................. 2012-091909

(51) Int. Cl.
*G06F 1/32*           (2006.01)

(52) U.S. Cl.
CPC ............ *G06F 1/3234* (2013.01); *G06F 1/3206* (2013.01); *G06F 1/3293* (2013.01)

(58) Field of Classification Search
USPC .................... 455/414.1, 574, 575.1
See application file for complete search history.

(56) References Cited

U.S. PATENT DOCUMENTS

2013/0113681 A1* 5/2013 Zhang ........................... 345/1.1

FOREIGN PATENT DOCUMENTS

JP          2006-25347          1/2006

* cited by examiner

*Primary Examiner* — Sam Bhattacharya
(74) *Attorney, Agent, or Firm* — Fish & Richardson P.C.

(57) ABSTRACT

A main processor of mobile phone changes from power saving state to active state for changing display in response to a sub processor for sensors, the main processor returning to the power saving state after changing the display. The main processor changes from power saving state to active state for storing information from the sub processor, the main processor returning to the power saving state after the storing function. The main processor selects the stored display data on the basis of the information from the sub processor to change display. The main processor receives and stores information from the sub processor in the boot up process or before finishing the operation. The sub processor is in the active state so as to control the sensor even in a case where the main processor is in the power saving state.

19 Claims, 4 Drawing Sheets

＃ MOBILE PHONE

CROSS-REFERENCE TO RELATED APPLICATIONS

This application is based on Japanese Patent Application No. 2012-091909 filed on Apr. 13, 2012, the contents of which are hereby incorporated by reference.

BACKGROUND OF THE INVENTION

1. Field of the Invention

The present invention relates to a mobile phone.

2. Description of Related Art

As to a portable device such as a mobile phone using a battery, there have been various proposals for saving power. For instance, in order to provide a portable terminal that performs power supply control for saving power and can quickly start a specific function, the following control is proposed. When a main CPU receives an operation of an execution start key for a specific function, the main CPU starts power supply to a RAM and transfers a program for the specific function from a flash memory to the RAM so that a sub CPU executes the program for the specific function in the RAM. Further, when the main CPU receives an operation of an execution stop key for the specific function, the main CPU controls a timer to clock a time and stops the power supply to the RAM after a predetermined time elapses (see JP-A-2006-25347).

However, there are still many problems to solve for saving power in multifunction mobile phones such as smart phones.

SUMMARY OF THE INVENTION

It is an object of the present invention to provide a mobile phone that can effectively save power in view of the above-mentioned problem.

A mobile phone of the present invention includes an application processor as a main processor, and a sensor control microcomputer as a sub processor which communicates information with the application processor. The application processor can change between an active state and a power saving state. In other words the application processor changes from the power saving state to the active state if it is necessary for the application processor to change a display on the display unit in response to information from the sensor control microcomputer, and changes from the active state to the power saving state if there is no other task after changing the display.

A mobile phone of the present invention includes an application processor, and a sensor control microcomputer which communicates information with the application processor. The application processor can change between an active state and a power saving state. In other words the application processor changes from the power saving state to the active state if it is if it is necessary for the application processor to store the information from the sensor control microcomputer, and changes from the active state to the power saving state if there is no other task after the storing.

A mobile phone of the present invention includes an application processor, and a sensor control microcomputer which communicates information with the application processor. The application processor can change between an active state and a power saving state. The application processor has stored selectable display data for changing a display on the display unit, and selects the stored display data on the basis of the information from the sensor control microcomputer, so as to change the display on the display unit.

A mobile phone of the present invention includes an application processor, and a sensor control microcomputer which communicates information with the application processor. The application processor can change between an active state and a power saving state. The application processor changes from the power saving state to the active state in the boot up process, so as to receive and store the information from the sensor control microcomputer.

A mobile phone of the present invention includes an application processor, and a sensor control microcomputer which communicates information with the application processor. The application processor can change between an active state for controlling the telephone function part and a power saving state. The application processor changes from the power saving state to the active state before finishing the operation, so as to receive and store the information from the sensor control microcomputer.

As described above, according to the present invention, a mobile phone is provided which realizes effective power saving.

Note that other features, elements, steps, merits, and characteristics of the present invention will be apparent from the following detailed description of the best mode embodiment and the attached relevant drawings.

DETAILED DESCRIPTION OF THE PREFERRED EMBODIMENTS

Figure 1:
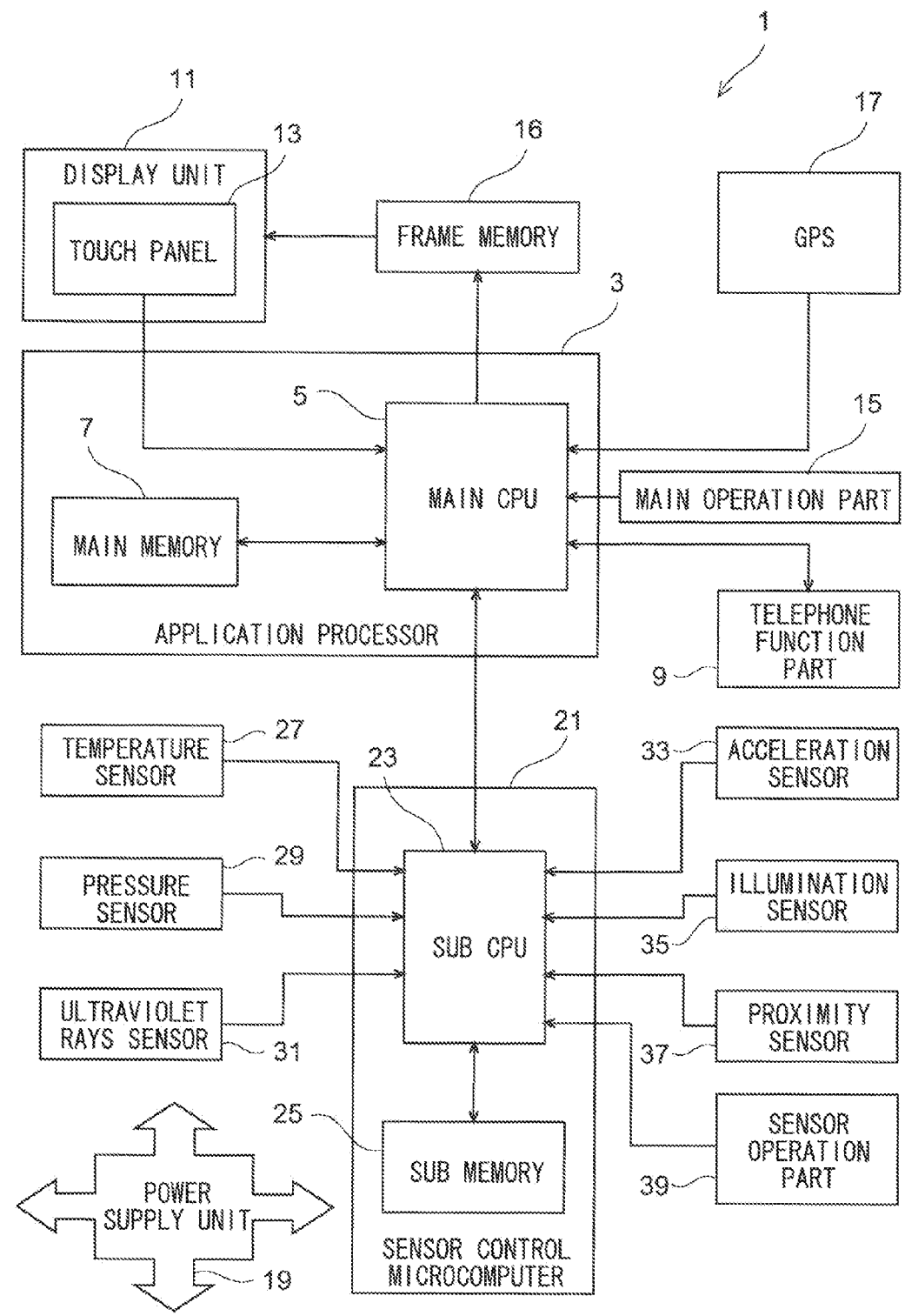
FIG. 1 is a block diagram illustrating an example of a mobile phone according to an embodiment of the present invention.

FIG. 1 is a block diagram illustrating an example of a mobile phone according to an embodiment of the present invention. In FIG. 1, a main part of the mobile phone 1 is controlled by an application processor 3. The application processor 3 includes a main CPU 5 and a main memory 7. The main memory 7 stores a program and data for operating the main CPU 5, and temporarily stores various data during operation stages of the main CPU 5.

A telephone function part 9 having a communication function is controlled by the main CPU 5 to perform a telephone function including calling, receiving, and settings, in accordance with an operation of a main operation part 15 including a GUI on a touch panel 13 incorporated in a display unit 11 and a power switch. A display on the display unit 11 is controlled by a frame memory 16 that stores display data sent from the main CPU 5. The main CPU 5 further controls a GPS unit 17 so as to detect a position of the mobile phone 1 and to process the detected position information. As described above, the main CPU 5 controls main functions of the mobile phone 1 and works on the basis of a high speed clock. A power supply unit 19 including a chargeable battery and a power management part supplies power to the entire mobile phone 1.

Because the main CPU 5 works on the basis of the high speed clock, consumption of power from the power supply unit 19 is large. Therefore, the main CPU 5 and its related functions are designed so as to perform clock control according to the circumstance and power saving drive on the basis of power supply control. In other words, the main CPU 5 frequently changes from a normal active state to a power saving state if there is no state change of the mobile phone 1. For instance, if there is no change of image displayed on the display unit 11, it is not necessary to update display data in the frame memory 16. Therefore, the main CPU 5 changes to the power saving state as long as there is no other task. Then, when it becomes necessary to change a display, the main CPU 5 returns to the normal active state. After that, if there is no task for a predetermined time, the main CPU 5 changes to the power saving state again.

A sensor control microcomputer 21, which works on the basis of a low speed clock with low power consumption, includes a sub CPU 23 and a sub memory 25. The sub memory 25 stores a program and data for operating the sub CPU 23 and temporarily stores various data during operation stages of the sub CPU 23. The sub CPU 23 controls a temperature sensor 27 for detecting temperature or the like, a pressure sensor 29 for detecting air pressure or the like, an ultraviolet rays sensor 31 for detecting intensity of ultraviolet rays affecting the skin, an acceleration sensor 33 for detecting movement or position of the mobile phone 1 or the number of footsteps of the person who carries the mobile phone 1, an illumination sensor 35 for detecting illumination, a proximity sensor 37 for detecting approach of the mobile phone 1 to the ear, and the like. The sub CPU 23 cooperates with the main CPU 5 and maintains the active state even if the main CPU 5 is in the power saving state, so as to control the sensors as described above and to control the sub memory 25 to store detected information of each sensor. A sensor operation part 39 is for performing an operation concerning only the function of the sub CPU 23 and is mainly used for operation of each sensor. For instance, when the sensor operation part 39 is operated, measurement of ultraviolet rays by the ultraviolet rays sensor 31 or other operation having no relationship with the telephone function is performed, and the telephone function part 9 or the like does not work directly on the basis of the operation.

Description of cooperation between the sub CPU 23 and the main CPU 5 is added as follows. When power supply to the mobile phone 1 is turned on by the operation of the main operation part 15 so as to boot up the main CPU 5, the detected information of each sensor stored in the sub memory 25 is sent from the sub CPU 23 to the main CPU 5 and is stored in the main memory 7. Thus, synchronization between them is achieved. In addition, also when the power supply to the mobile phone 1 is turned off by the operation of the main operation part 15, the detected information of each sensor stored in the sub memory 25 is sent from the sub CPU 23 to the main CPU 5 before the termination process of the main CPU 5. Thus, stored information is synchronized between the sub memory 25 and the main memory 7 when the sub CPU is turned off, and then the entire mobile phone 1 is turned off.

In addition, in order to make the display unit 11 display the operation of the sensor operation part 39 or the detected information of each sensor, if the main CPU 5 is in the power saving state when the display change is requested, the main CPU 5 returns to the normal active state, and the display data in the frame memory 16 is updated by information sent from the sub CPU 23 to the main CPU 5. Then, if there is no task for a predetermined time after that, the main CPU 5 changes to the power saving state again. During this period too, the sub CPU 23 maintains the active state so as to control the individual sensors and to control the sub memory 25 to store the detected information of each sensor.

As described above, the individual sensors are controlled by the sub CPU 23 that works at relatively low speed with small power consumption. Therefore, it is possible to continuously operate the sensors in the state where the telephone function part 9 does not work, and to operate the sensors by operation of the sensor operation part 39 without working the telephone function part 9. Thus, the main CPU 5 can get rid of load of controlling the above-mentioned sensors, and hence it is possible to prevent an inconvenience in which power is exhausted by operation of the sensors despite there is no calling.

Figure 2:
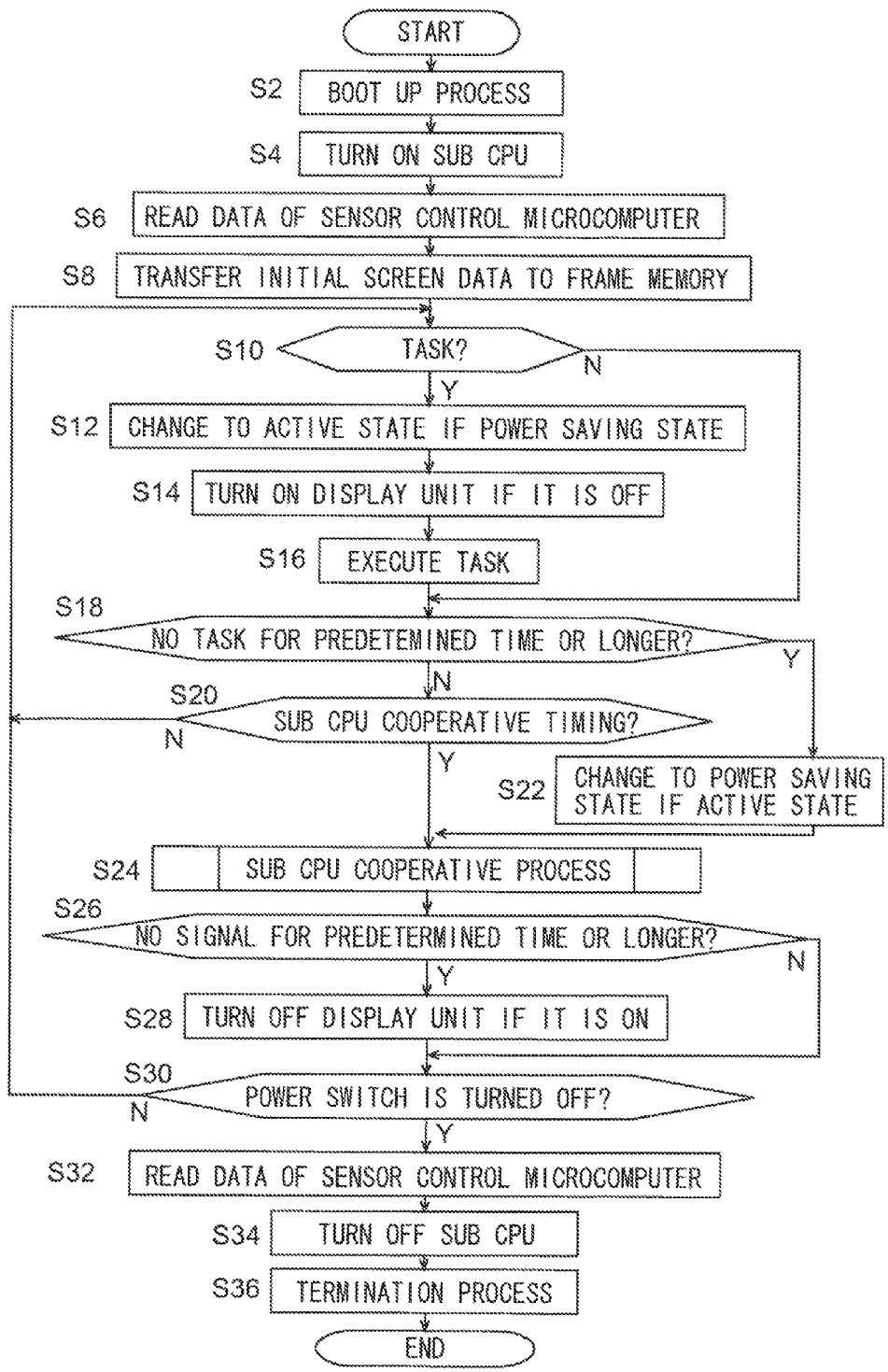
FIG. 2 is a flowchart illustrating a basic function of a main CPU in the example of FIG. 1.

FIG. 2 is a flowchart illustrating a basic function of the main CPU 5 in the example of FIG. 1. The process flow starts when the power switch of the main operation part 15 is turned on, and a boot up process of the mobile phone 1 is performed in Step S2. Then, turn on of the sub CPU 23 is instructed in Step S4, and latest data of the sensor control microcomputer 21 stored in the sub memory 25 is read in Step S6. Next, initial screen data when the mobile phone boots up is transferred to the frame memory 16 in Step S8, and the process flow goes to Step S10.

In Step S10, it is checked whether or not there is a next task. If there is a task, the process flow goes to Step S12. In Step S12, if the main CPU 5 is in the power saving state, it is changed to the normal active state, and the process flow goes to Step S14. If it is already in the active state, the process flow goes to Step S14 without performing any process in Step S12. In Step S14, if the display unit 11 is in the OFF state, it is turned on, and the process flow goes to Step S16. If the display unit 11 is already in the ON state, the process flow goes to Step S16 without performing any process in Step S14. Then, a predetermined task is performed in Step S16, and the process flow goes to Step S18. On the contrary, if there is not the next task in Step S10, the process flow goes directly to Step S18.

In Step S18, it is checked whether or not there is no task for a predetermined time or longer. If the result is false, the process flow goes to Step S20. In Step S20, it is checked whether it is a sub CPU cooperative timing or not. If the result is false, the process flow goes back to Step S10. After that, the process flow repeats the process from Step S10 to Step S20 as long as the state where there is no task for a predetermined time or longer is not detected in Step S18 and it is not detected to be in the sub CPU cooperative timing in Step S20, so as to perform tasks successively in Step S16.

On the contrary, if the state where there is no task for a predetermined time or longer is detected in Step S18, the process flow goes to Step S22. Then, if the main CPU 5 is in the normal active state, it is changed to the power saving state, and the process flow goes to Step S24. If it is already in the power saving state, the process flow goes to Step S24 without performing any process in Step S22. In addition, if it is detected to be in the sub CPU cooperative timing in Step S20 too, the process flow goes to Step S24.

The process of Step S24 is the sub CPU cooperative process for cooperating with the sub CPU 23 so as to read latest data of the sensor control microcomputer 21 and to perform control of a display on the basis of the latest data. Details of the process will be described later. When the sub CPU cooperative process is finished, the process flow goes to Step S26, and it is checked whether or not the state where there is no operation signal from the touch panel 13, from the main operation part 15, or from the sensor operation part 39 has continued for a predetermined time or longer. Then, if the result is true, the process flow goes to Step S28. If the display unit 11 is in the ON state, it is turned off, and the process flow goes to Step S30. On the contrary, if it is not detected in Step S26 that the state where there is no operation signal has continued for a predetermined time or longer, the process flow goes directly to Step S30.

In Step S30, it is checked whether or not the power switch is turned off in the main operation part 15. If the power switch is not turned off, the process flow goes back to Step S10, and the process from Step S10 to Step S30 is repeated as long as the power switch is not turned off. On the contrary, if it is detected in Step S30 that the power switch is turned off, the process flow goes to Step S32, and latest data of the sensor control microcomputer 21 stored in the sub memory 25 is read. Then, the process flow goes to Step S34, and turn off of the sub CPU 23 is instructed. After that, the termination process of the mobile phone 1 is performed in Step S36, and the process flow is finished.

Figure 3:
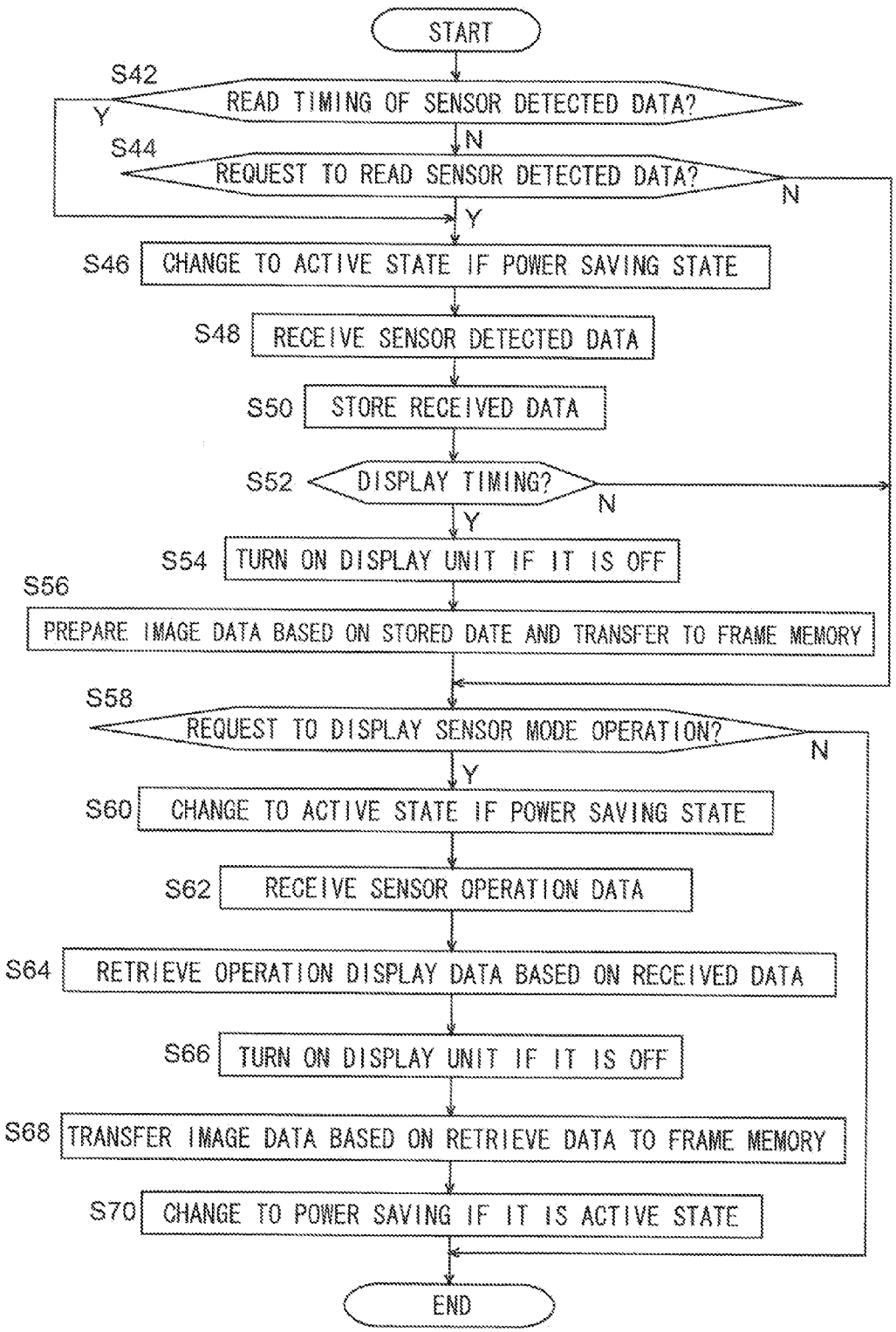
FIG. 3 is a flowchart illustrating details of Step S24 in FIG. 2.

FIG. 3 is a flowchart illustrating details of the sub CPU cooperative process in Step S24 of FIG. 2. When the process flow starts, it is checked in Step S42 whether or not the read timing of sensor detected data has come. If the result is false, the process flow goes to Step S44 in which it is checked whether or not there is a request to read the sensor detected data from the sub CPU 23. If there is the request, the process flow goes to Step S46. Note that if it is detected in Step S42 that the sensor detected data read timing has come, too, the process flow goes to Step S46.

In Step S46, if the main CPU 5 is in the power saving state, it is changed to the normal active state, and the process flow goes to Step S48. If it is already in the active state, the process flow goes to Step S48 without performing any process in Step S46. The sensor detected data is received from the sub CPU 23 in Step S48, and the received data is stored in the main memory 7 in Step S50. Next in Step S52, it is checked whether or not the display timing of the date stored in the main memory 7 has come. If the display timing has come, the process flow goes to Step S54. In Step S54, if the display unit 11 is in the OFF state, it is turned on, and the process flow goes to Step S56. If the display unit 11 is already in the ON state, the process flow goes to Step S56 without performing any process in Step S54. In Step S56, image data for display is prepared on the basis of stored date in the main memory 7 and is transferred to the frame memory 16 so as to update the same, and the process flow goes to Step S58. Thus, the display on the display unit 11 is changed to one based on the received sensor detected data. Specifically, there are prepared a plurality of image data for display in the main memory 7 in advance, and one of them is selected on the basis of the received sensor detected data and is transferred to the frame memory 16.

On the contrary, if it is checked in Step S52 that the display timing has not come yet, the process flow goes directly to Step S58. In this case, only reception and storing of the sensor detected data is performed, and display thereof is performed at the next display timing. Therefore, if the display unit 11 is in the OFF state, the OFF state is continued. Note that if the request to read the sensor detected data is not detected in Step S44 too, the process flow goes to Step S58.

In Step S58, it is checked whether or not a request to display an operation such as setting or selection in the sensor mode on the display unit 11 is received from the sub CPU 23. Here, the sensor mode is a mode that uses a function based on detection by each sensor and basically does not use the telephone function. Specifically, a pedometer, measurement of ultraviolet rays, and the like are functions in the sensor mode. The request detected in Step S58 is sent to the main CPU 5 when the sub CPU 23 detects the corresponding operation in the sensor operation part 39. Then, if there is the request, the process flow goes to Step S60. If the main CPU 5 is in the power saving state, it is changed to the normal active state, and the process flow goes to Step S62. If it is already in the active state, the process flow goes to Step S62 without performing any process in Step S60. In Step S62, sensor operation data is received from the sub CPU 23. In Step S64, corresponding operation display data is retrieved from the main memory 7 on the basis of the received data, and the process flow goes to Step S66.

In Step S66, if the display unit 11 is in the OFF state, it is turned on, and the process flow goes to Step S68. If the display unit 11 is already in the ON state, the process flow goes to Step S68 without performing any process in Step S66. In Step S68, the retrieved operation image data for display in the main memory 7 is transferred to the frame memory 16 and is updated, and the process flow goes to Step S70. Thus, the display on the display unit 11 is changed to a display based on the received sensor operation data.

In Step S70, if the main CPU 5 is in the normal active state, it is changed to the power saving state, and the process flow is finished. If it is already in the power saving state, the process flow is finished without performing any process in Step S70. On the contrary, if it is checked in Step S58 that there is no request to display sensor mode operation, the process flow is directly finished. The finish of the process flow in FIG. 3 means to go to Step S26 in FIG. 2. Note that as understood from the above description, if the sensor detected data read timing has not come yet in Step S42, and if the request to read the sensor detected data from the sub CPU 23 is not detected in Step S44, and if the request to display the operation such as setting or selection in the sensor mode on the display unit 11 is not detected in Step S58, no process is performed in the process flow of FIG. 3, and the process flow of FIG. 2 goes from Step S20 or Step S22 directly to Step S26.

Figure 4:
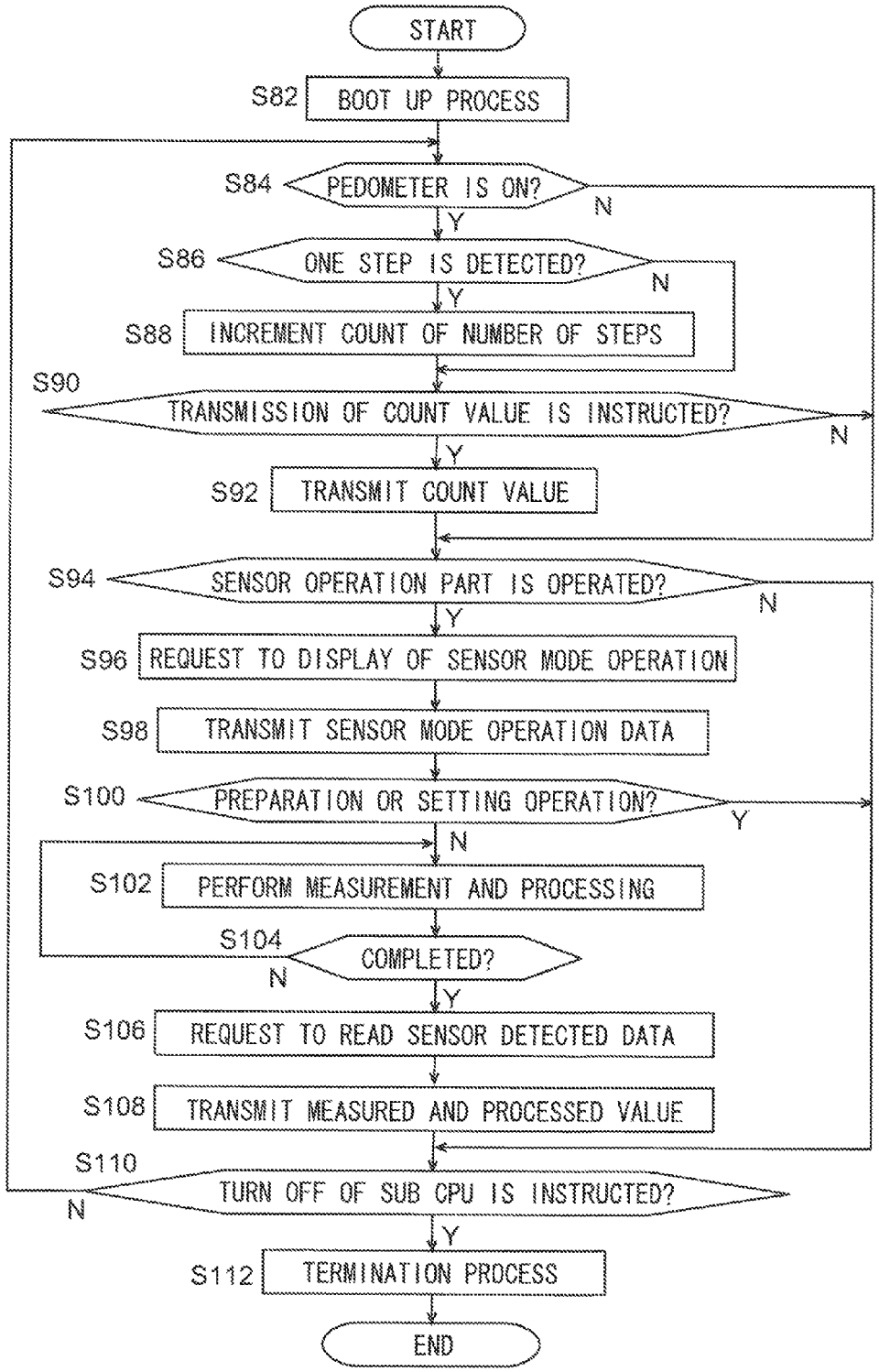
FIG. 4 is a flowchart illustrating a basic function of a sub CPU in the example of FIG. 1.

FIG. 4 is a flowchart illustrating a basic function of the sub CPU 23 in the example of FIG. 1. The process flow starts when the main CPU 5 issues the turn-on instruction in Step S4 of FIG. 2. In Step S82, a boot up process of the sub CPU 23 and the sensors controlled by the sub CPU 23 is performed. Next in Step S84, it is checked whether or not a pedometer function based on detection by the acceleration sensor 33 is turned on. If the pedometer function is in the ON state, the process flow goes to Step S86 in which it is checked whether or not footsteps proceeded by one step on the basis of detection by the acceleration sensor 33. Then, if it is detected that footsteps proceeded by one step, the process flow goes to Step S88 in which count of the number of footsteps is incremented by one step, and the process flow goes to Step S90. On the contrary, if the one step is not detected in Step S86, the process flow goes directly to Step S90.

In Step S90, it is detected whether or not instruction to transmit a count value is issued. This instruction specifically corresponds to an instruction from the main CPU 5 when the sensor detected data read timing has come (which is issued in case of YES in Step S42 of FIG. 3), or to an instruction of the sub CPU 23 itself that detects the operation of the sensor operation part 39 (which is transmitted to the main CPU 5 too, and is detected by the main CPU 5 too in Step S44 of FIG. 3). Further, when this count value transmission instruction is detected, the process flow goes to Step S92 in which the count value is transmitted to the main CPU 5, and the process flow goes to Step S94. On the contrary, if the count value transmission instruction is not detected in Step S90, the process flow goes directly to Step S94. In this way, if the count value transmission instruction is not detected, the sub CPU 23 performs only the increment of count of the number of footsteps by the pedometer function, and the main CPU 5 does not participate in the pedometer function. Note that if the turn-on of the pedometer function is not detected in Step S84, the process flow goes directly to Step S94.

In Step S94, it is checked whether or not the operation by the sensor operation part 39 is performed. Then, if the operation is detected, the process flow goes to Step S96 in which the sensor mode operation display is requested to the main CPU 5, and the sensor mode operation data is transmitted in Step S98. Next in Step S100, it is checked whether or not the operation of the sensor operation part 39 detected in Step S94 is a preparing operation or a setting operation for detection by each sensor. If the result is false, the operation corresponds to measuring operation in the sensor mode, and therefore the process flow goes to Step S102 in which measurement by a relevant sensor and a process of the measurement result are performed. Then in Step S104, it is checked whether or not the measurement and the processing are completed. If they are not completed, the process flow goes back to Step S102, and the process of Step S102 and Step S104 is repeated until the completion is detected in Step S104.

If it is detected in Step S104 that the measurement and the processing are completed, the process flow goes to Step S106 in which the main CPU 5 is requested to read the sensor detected data as a measured and processed value. Further in Step S108, the measured and processed value is transmitted to the main CPU 5, and the process flow goes to Step S110. On the contrary, if it is checked in Step S100 that the operation of the sensor operation part 39 is the preparing operation or the setting operation, the process flow goes directly to Step S110. In this case, only a process of displaying the operation data transmitted in Step S98 on the display unit 11 is performed. By operating the sensor operation part 39 while viewing a display variation on the display unit 11, it is possible to perform the preparing operation or the setting operation in the sensor mode. Note that if it is not detected in Step S94 that the operation by the sensor operation part 39 is performed, the process flow goes directly to Step S110.

In Step S110, it is checked whether or not the main CPU 5 has issued instruction to turn off the sub CPU 23. If the instruction is not issued, the process flow goes back to Step S84. If the instruction to turn off the sub CPU 23 is detected in Step S110, the process flow goes to Step S112 in which a termination process of the sub CPU 23 is performed, and the process flow is finished.

Note that in the above description, the best mode of the present invention is described. However, the disclosed invention can be modified by various methods. In addition, it is obvious to a skilled person in the art that the invention can be embodied in various manners different from the above-mentioned specific structure. Therefore, the claims described later are intended to include all variation examples of the present invention in its technical range without deviating from the spirit and technical field of view of the present invention.

Various features and merits thereof in the present invention exemplified in the example described above are summarized as follows.

According to the example described above, a mobile phone is provided, which includes a telephone function part, a display unit, a main processor which controls the telephone function part and the display unit, a sensor, a sensor operation part, and a sensor control sub processor which responds to operation of the sensor operation part so as to control the sensor and to communicate information with the main processor. The main processor can change between an active state for controlling the telephone function part and a power saving state. When the main processor changes a display on the display unit in accordance with information from the sensor control sub processor, the main processor changes to the active state if it is in the power saving state, and changes to the power saving state if there is no other task after the display is changed. Thus, the main processor can change to the power saving state as long as there is no other task except for a case where the display on the display unit is changed in accordance with information from the sensor control sub processor. Therefore, even if the sensor is operating, it is possible to reduce power consumption by the main processor. According to the specific feature of the above-mentioned example, power consumption by the sensor control sub processor can be substantially smaller than power consumption by the main processor in the active state.

According to another specific feature of the above-mentioned example, the information from the sensor control sub processor for changing the display on the display unit is information detected by the sensor. Thus, the main processor can change to the power saving state as long as there is no other task except for a case where the display on the display unit is changed in accordance with information detected by the sensor. According to another specific feature of the above-mentioned example, the information from the sensor control sub processor for changing the display on the display unit is operation information of the sensor operation part. Thus, the main processor can change to the power saving state as long as there is no other task except for a case where the display on the display unit is changed in accordance with operation information of the sensor operation part.

According to another specific feature of the above-mentioned example, when the main processor stores information from the sensor control sub processor, the main processor changes to the active state if it is in the power saving state, and changes to the power saving state if there is no other task after the storing. In addition, according to another specific feature, the main processor stores display data for changing the display on the display unit in accordance with information from the sensor control sub processor, and selects the stored display data on the basis of the information from the sensor control sub processor so as to change the display on the display unit. Further, according to another specific feature, the main processor receives and stores the information from the sensor control sub processor in the boot up process. In addition, according to another specific feature, the main processor receives and stores the information from the sensor control sub processor before finishing the operation.

According to still another specific feature of the above-mentioned example, the sensor control sub processor is in the active state also when the main processor is in the power saving state, so as to control the sensor. Thus, it is possible to maintain the main processor in the power saving state while performing necessary sensor control. Therefore, even if the sensor is operating, power consumption by the main processor can be reduced.

According to another feature of the above-mentioned example, a mobile phone is provided, which includes a telephone function part, a display unit, a main processor which controls the telephone function part and the display unit, a sensor, a sensor operation part, and a sensor control sub processor which responds to operation of the sensor operation part so as to control the sensor and to communicate information with the main processor. The application processor can change between an active state for controlling the telephone function part and a power saving state. When the main processor stores information from the sensor control sub processor, the main processor changes to the active state if it is in the power saving state, and changes to the power saving state if there is no other task after the storing. Thus, the main processor can change to the power saving state as long as there is no other task except for a case where the information from the sensor control sub processor is stored. Therefore, even if the sensor is operating, it is possible to reduce power consumption by the main processor.

According to a specific feature of the above-mentioned example, the display unit can change between a display ON state and a display OFF state. When the display unit stores the information from the sensor control sub processor, the display unit continues the display OFF state if it is in the display OFF state, as long as the display timing has not come. Thus, the main processor can store the information from the sensor control sub processor while maintaining the power saving by the display OFF state.

According to another feature of the above-mentioned example, a mobile phone is provided, which includes a telephone function part, a display unit, a main processor which controls the telephone function part and the display unit, a sensor, a sensor operation part, and a sensor control sub processor which responds to operation of the sensor operation part so as to control the sensor and to communicate information with the main processor. The main processor can change between an active state for controlling the telephone function part and a power saving state, and stores display data for changing a display on the display unit by information from the sensor control sub processor. The main processor selects the stored display data on the basis of the information from the sensor control sub processor and changes the display on the display unit. Thus, it is possible to realize appropriate cooperation between the main processor and the sensor control sub processor, and display change based on the cooperation.

According to another feature of the above-mentioned example, a mobile phone is provided, which includes a telephone function part, a display unit, a main processor which controls the telephone function part and the display unit, a sensor, a sensor operation part, and a sensor control sub processor which responds to operation of the sensor operation part so as to control the sensor and to communicate information with the main processor. The main processor can change between an active state for controlling the telephone function part and a power saving state, and becomes the active state in the boot up process so as to receive and store the information from the sensor control sub processor. Thus, in the boot up process, the main processor can synchronize with the sensor control sub processor.

According to another feature of the above-mentioned example, a mobile phone is provided, which includes a telephone function part, a display unit, a main processor which controls the telephone function part and the display unit, a sensor, a sensor operation part, a sensor control sub processor which responds to operation of the sensor operation part so as to control the sensor and to communicate information with the main processor. The main processor can change between an active state for controlling the telephone function part and a power saving state, and becomes the active state before finishing the operation so as to receive and store the information from the sensor control sub processor. Thus, stored information is synchronized between the main processor and the sensor control sub processor, and afterward the entire mobile phone is turned off.

INDUSTRIAL APPLICABILITY

The present invention can be applied to the mobile phone.

LIST OF REFERENCE NUMERALS 9 telephone function part
11 display unit
3 application processor
27, 29, 31, 33, 35, 37 sensor
39 sensor operation part
21 sensor control microcomputer

What is claimed is:

1. A mobile phone comprising:
a telephone function part;
a display unit;
a main processor which controls the telephone function part and the display unit;
a sensor;
a sensor operation part; and
a sensor control sub processor which responds to operation of the sensor operation part so as to control the sensor and to communicate information with the main processor,
wherein the main processor can change between an active state for controlling the telephone function part and a power saving state,
wherein the main processor changes from the power saving state to the active state if it is necessary for the main processor to change a display on the display unit in response to the information transmitted from the sensor control sub processor, and changes from the active state to the power saving state if there is no other task after the display is changed, and
wherein the information transmitted from the sensor control sub processor to the main processor includes information detected by the sensor while the main processor was in the power saving state.

2. The mobile phone according to claim 1, wherein power consumption of the sensor control sub processor is substantially smaller than power consumption of the main processor in the active state.

3. The mobile phone according to claim 1, wherein the information from the sensor control sub processor for changing the display on the display unit is operation information of the sensor operation part.

4. The mobile phone according to claim 1, wherein the main processor changes to the active state if the main processor is in the power saving state when storing the information from the sensor control sub processor, and changes to the power saving state if there is no other task after the storing.

5. The mobile phone according to claim 1, wherein the main processor stores display data for changing the display on the display unit by the information from the sensor control sub processor, and selects the stored display data on the basis of the information from the sensor control sub processor so as to change the display on the display unit.

6. The mobile phone according to claim 1, wherein the main processor receives and stores the information from the sensor control sub processor in the boot up process.

7. The mobile phone according to claim 1, wherein the main processor receives and stores the information from the sensor control sub processor before finishing the operation.

8. The mobile phone according to claim 1, wherein the sensor control sub processor is in the active state so as to control the sensor also in a case where the main processor is in the power saving state.

9. A mobile phone comprising:
a telephone function part;
a display unit;
a main processor which controls the telephone function part and the display unit;
a sensor;
sensor operation part; and a sensor control sub processor which responds to operation of the sensor operation part so as to control the sensor and to communicate information with the main processor, wherein the main processor can change between an active state for controlling the telephone function part and a power saving state, wherein the main processor changes from the power saving state to the active state if the main processor stores the information transmitted from the sensor control sub processor, and changes from the active state to the power saving state if there is no other task after the storing, and wherein the information transmitted from the sensor control sub processor to the main processor includes information detected by the sensor while the main processor was in the power saving state.

10. The mobile phone according to claim 9, wherein the display unit can change between a display ON state and a display OFF state, and continues the display OFF state if the display unit is in the display OFF state as long as display timing has not come when storing the information from the sensor control sub processor.

11. The mobile phone according to claim 9, wherein power consumption of the sensor control sub processor is substantially smaller than power consumption of the main processor in the active state.

12. A mobile phone comprising:
a telephone function part;
a display unit;
a main processor which controls the telephone function part and the display unit;
a sensor;
a sensor operation part; and
a sensor control sub processor which responds to operation of the sensor operation part so as to control the sensor and to communicate information with the main processor, wherein the main processor can change between an active state for controlling the telephone function part and a power saving state, wherein the main processor has stored selectable display data for changing the display on the display unit, wherein the main processor selects the stored display data on the basis of the information transmitted from the sensor control sub processor in response to the operation of the sensor operation part, so as to change the display on the display unit, and wherein the information transmitted from the sensor control sub processor to the main processor includes information detected by the sensor while the main processor was in the power saving state.

13. The mobile phone according to claim 12, wherein power consumption of the sensor control sub processor is substantially smaller than power consumption of the main processor in the active state.

14. The mobile phone according to claim 12, wherein the sensor control sub processor responds to operation of the sensor operation part so as to control the sensor also in a case where the main processor is in the power saving state.

15. A mobile phone comprising:
a telephone function part;
a display unit;
a main processor which controls the telephone function part and the display unit;
a sensor;
a sensor operation part; and
a sensor control sub processor which responds to operation of the sensor operation part so as to control the sensor and to communicate information with the main processor, wherein the main processor can change between an active state for controlling the telephone function part and a power saving state, wherein the main processor changes from the power saving state to the active state in the boot up process so as to receive and store the information transmitted from the sensor control sub processor, and wherein the information transmitted from the sensor control sub processor to the main processor includes information detected by the sensor while the main processor was in the power saving state.

16. The mobile phone according to claim 15, wherein power consumption of the sensor control sub processor is substantially smaller than power consumption of the main processor in the active state.

17. The mobile phone according to claim 15, wherein the sensor control sub processor responds to operation of the sensor operation part so as to control the sensor also in a case where the main processor is in the power saving state.

18. A mobile phone comprising:
a telephone function part;
a display unit;
a main processor which controls the telephone function part and the display unit;
a sensor;
a sensor operation part; and
a sensor control sub processor which responds to operation of the sensor operation part so as to control the sensor and to communicate information with the main processor, wherein the main processor can change between an active state for controlling the telephone function part and a power saving state, wherein the main processor changes from the power saving state to the active state before finishing process so as to receive and store the information transmitted from the sensor control sub processor, and wherein the information transmitted from the sensor control sub processor to the main processor includes information detected by the sensor while the main processor was in the power saving state.

19. The mobile phone according to claim 18, wherein power consumption of the sensor control sub processor is substantially smaller than power consumption of the main processor in the active state.

* * * * *